United States Patent [19]

Sukup

[11] 4,009,520
[45] Mar. 1, 1977

[54] GRAIN DRYING SYSTEMS

[76] Inventor: Eugene G. Sukup, Dougherty, Iowa 50433

[22] Filed: July 21, 1975

[21] Appl. No.: 597,362

[52] U.S. Cl. .................................... 34/233; 98/55
[51] Int. Cl.² ........................................ F26B 19/00
[58] Field of Search ............ 34/168, 174, 176, 201, 34/231–233; 98/54, 55, 50, 52

[56] References Cited

UNITED STATES PATENTS

| | | | |
|---|---|---|---|
| 1,020,256 | 3/1912 | Boll | 98/55 |
| 2,126,107 | 8/1938 | Gordon | 98/55 |
| 3,531,874 | 10/1970 | Sukup | 98/55 |

Primary Examiner—Kenneth W. Sprague
Assistant Examiner—James C. Yeung
Attorney, Agent, or Firm—Neuman, Williams, Anderson & Olson

[57] ABSTRACT

In a grain drying bin, drying conduit members are attached to the inside wall and extend to and rest on the foundation to supportively reinforce the bin wall and thereby permit use of lighter gauge wall panels, while also serving the air distribution function of such conduits.

9 Claims, 6 Drawing Figures

GRAIN DRYING SYSTEMS

This invention relates to grain drying bins, and more particularly to an improved assembly of the type disclosed in the present inventor's prior U.S. Pat. No. 3,531,874.

As noted in the aforementioned prior patent, the stockpiling and storage of grain has become common practice in modern farming. Of the many possible storage structures, one commonly used is a noninsulated bin formed of sheets or panels of metal. Typically, such a bin is constructed of corrugated curved steel sheets that are boiled together to form the walls. In the construction of such a bin, the corrugated sheets or panels usually are bolted together end to end to form "rings", and the panels of successive rings are bolted together along overlapping side edges to form a vertical cylindrical bin wall. The individual panels normally are of uniform size. The bin is topped by a sloping metal roof with a single central apex. A perforated subfloor is provided, upon which the grain is loaded. Drying air is forced into a plenum chamber beneath the perforated subfloor and flows through the subfloor and rises to the top of the bin, carrying with it moisture that was contained in the grain, and exits through a hole provided at the roof's apex. To assure uniform air flow, grain stirrers and the like have been employed in various configurations.

As also noted in the U.S. Pat. No. 3,531,874, it has been the experience of users of such a bin and drying system that the grain which is adjacent to the bin wall tends to have a higher moisture content such that spoilage may occur. This most frequently occurs in the cooler climates where condensation is more likely to occur, and frost is more apt to be formed on the bin wall. The reason for such a problem is that air does not circulate as uniformly along the side of the bin. This is caused by higher compaction, condensation collecting on the roof and wall and draining down the side of the bin, and the inability of stirring devices to stir the grain near the bin wall. As taught in the U.S. Pat. No. 3,531,874, the described drying and moisture accumulation problems may be overcome by providing perforate distribution ducts for drying air along the inner surface of the bin wall and in communication with the plenum chamber.

Another problem encountered in such bins arises from the load distribution and resulting stresses on the bins walls inherent to the confining of a semifluid material such as dried grain, soybeans and the like. When the bin is filled, the lower portion of the bin wall experiences greater structural stresses than the upper portion. A major factor in the stresses is the downward or compressive load imposed on the bin wall due to frictional engagement of the semifluid grain with the wall, which tends to cause crumpling or buckling failure in the lower rings. Thus, it is important to insure proper compressive structural strength of the wall and particularly of the lower rings. In the past, one solution to this problem has been to construct the bins with metal panels of various thicknesses, the panels of the lower rings being of greater thickness than the upper rings. However, this required additional metal as well as added inventory requirements for bin suppliers and additional construction care and organization for the bin fabricator, with attendant added costs. Another solution to the problem has been to provide vertical reinforcing ribs or stiffeners for supporting and reinforcing the panels against compressive failure.

It is an object of this invention to provide an improved bin assembly overcoming the aforenoted problems, and particularly to provide an assembly which retains the air flow and drying of structures as disclosed in the U.S. Pat. No. 3,531,874 while also permitting the use of relatively light gauge panels for forming the bin walls.

It is an object of this invention to provide a novel reinforcing device for drying grain which will effectively reinforce an existing storage bin.

It is another object of this invention to provide a device which is easily installed in existing grain drying bins.

Yet another object of this invention is to provide a grain drying assembly capable of attaining the above-mentioned objects and which is economical, simple and rugged in construction, and effective in use.

These objects and other features and advantages of this invention will become readily apparent upon reference to the following description, when taken in conjunction with the accompanying drawings.

In carrying out this invention in one illustrative form, a grain bin of the aforedescribed type is provided with a plurality of upright hollow duct members fastened to the interior of the bin wall and supported directly on the bin foundation, the members being in fluid communication at their lower ends with the plenum chamber below the subfloor of the bin, and each member being closed at the top and having a plurality of spaced air diffusing perforations formed therein and oriented to direct air flow laterally along the bin wall.

For a more complete understanding of this invention reference should now be had to the embodiment illustrated in the accompanying drawings and described below by way of an example of the invention. In the drawings.

Figure 1:
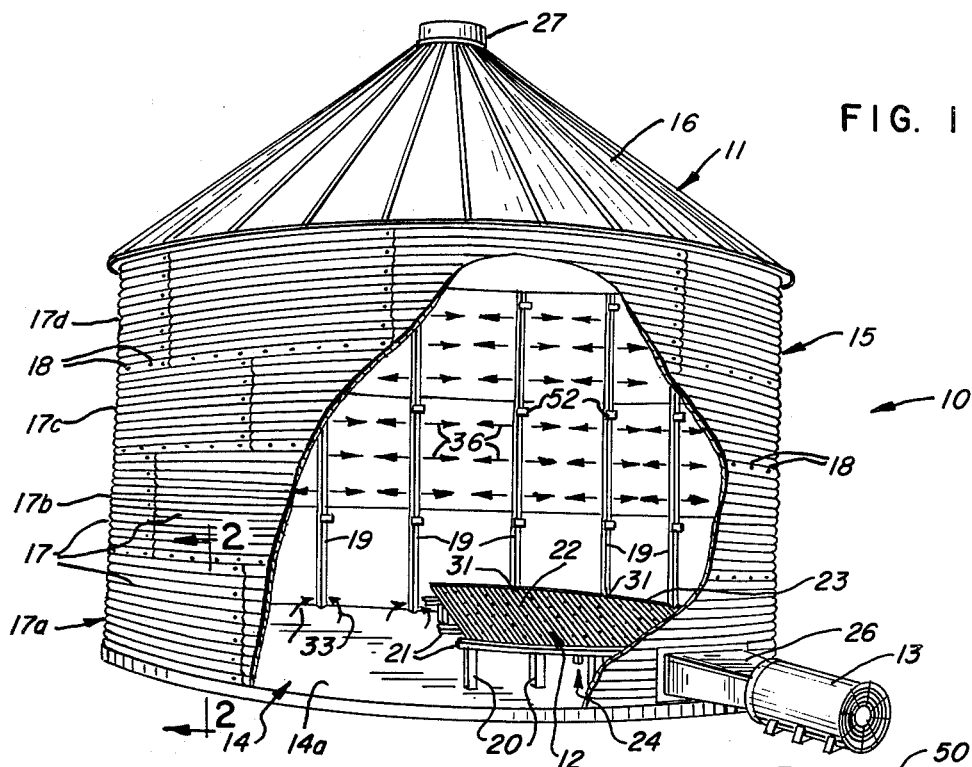
FIG. 1 is a perspective view of a grain drying bin assembly employing teachings of this invention, with part of the bin cut away for illustrative purposes.
Figure 2:
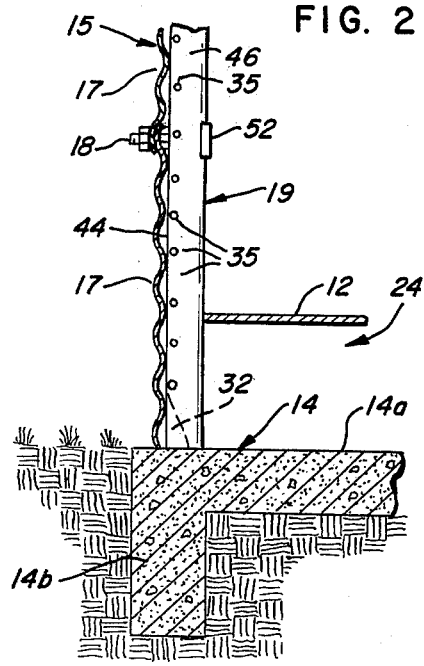
FIG. 2 is a partial vertical sectional view through the bin wall, as at arrows 2—2 in FIG. 1.
Figure 4:
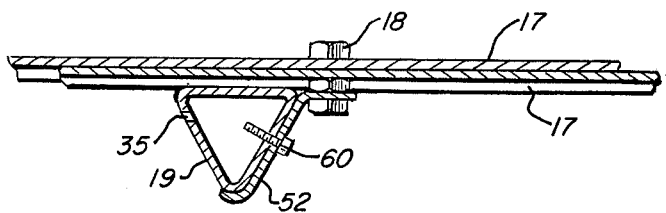
FIG. 4 is a sectional view taken along line 4—4 of FIG. 3 and looking in the direction of the arrows.

Referring to the drawings and particularly to FIG. 1, a drying bin assembly is indicated generally by the numeral 10 and includes, in assembled relation, a grain drying bin 11 having a subfloor 12, and a blower unit 13. The bin includes a foundation 14, including a floor 14a and a footing 14b (FIG. 2), supporting an upstanding wall 15 and a roof 16 attached to the wall 15 and enclosing the bin. The bin wall 15 is constructed of a plurality of curved corrugated metal sheets 17 placed in adjoining end overlapping relation to form rings 17a–17d, with the panels of adjacent rings in side overlapping relation. The panels 17 are affixed in such positions by bolts 18 through the overlapping end and side edge portions. A plurality of spaced rigid vertical reinforcing air ducts or conduits 19 in the form of tubes are attached to the wall 15 and rest at their lower ends on the foundation 14 to serve dual purposes of enhancing air circulation along the bin wall and reinforcing and supporting the bin wall as outlined further below.

Mounted on the floor 14a are a plurality of short vertical uprights 20 supporting a plurality of horizontal beams 21. The subfloor 12 has a plurality of perforations 22, such as by being formed of perforate metal panels, and rests upon the beams. Surrounding the periphery of the subfloor 12 is a flashing 23 which prevents grain (not shown) from falling between the subfloor 12 and the wall 15.

Warmed dry air is moved into the bin 11 by the blower unit 13, which includes a heater. The blower unit is connected by a duct 26 to a portion of the interior of the bin 11 between the subfloor 12 and the floor 14a and which constitutes a transition or plenum chamber 24. Warmed dry air fills this entire space 24, being forced therein, and flows upward through the perforations 22 and through the grain stored above said subfloor 12. The dry air being stored above said subfloor 12. The warmed dry air, being forced through the grain absorbs moisture therefrom and exits the bin 11 through an opening 27 in the roof. As the air passing through subfloor 12 rises through the grain, it may be ineffective in adequately removing moisture from the grain along the bin wall 15, leaving grain in the vicinity of the bin wall 15 "wet,", and susceptible to spoilage.

The supportive conduit members 19 are attached to the bin wall 15 and abut and rest on the foundation 14 of the bin 11. The members 19 are vertically disposed elongated hollow tubes, being horizontally spaced from each other and positioned along the inner surface of the bin wall 15 in uniformly spaced disposition about the entire perimeter of the bin. The lower portions 30 of the tubes 19 extend below the subfloor 12, through a series of openings 31 in the subfloor and in the flashing around the bin wall 15. The lower portion 30 of each tube 19 is open, as at 32, thereby permitting the forced air within the space 24 to enter each tube 19, as best illustrated by the arrows 33 in FIG. 1.

Figure 5:
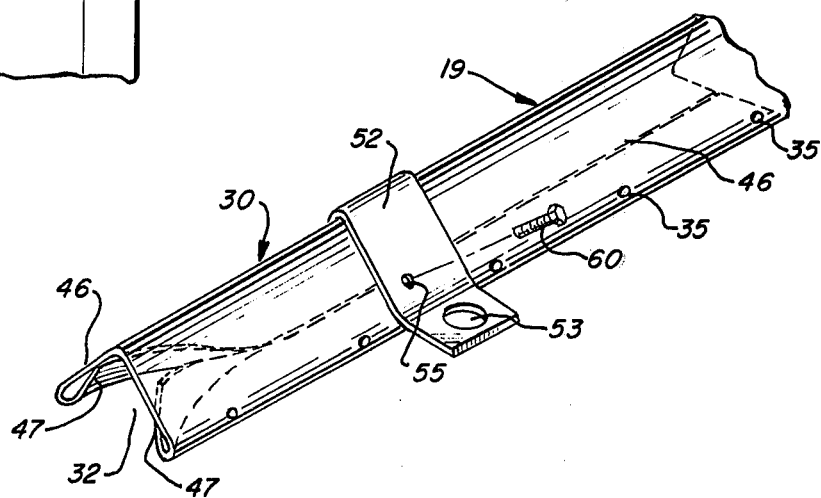
FIG. 5 is a partial perspective view of one of the reinforcing ducts.

As the tubes 19 are essentially identical, only one will be described. Each tube 19 is of unitary construction and of a desired shape that will provide rigidity and serve to effectively provide structural bin support, and is formed with appropriate holes therein to provide satisfactory air circulation in the vicinity of the bin wall 15. To the latter purpose, each tube 19 is provided with a series of vertically spaced holes 35 positioned on the tube 19 and formed so as to direct forced air emitted therethrough along the inner surface of the bin wall 15, substantially parallel to the wall, as best illustrated by the arrows 36 in FIGS. 1 and 3. The holes 35 may be directly opposite one another (FIG. 1) or in staggered relation (FIG. 5).

Figure 3:
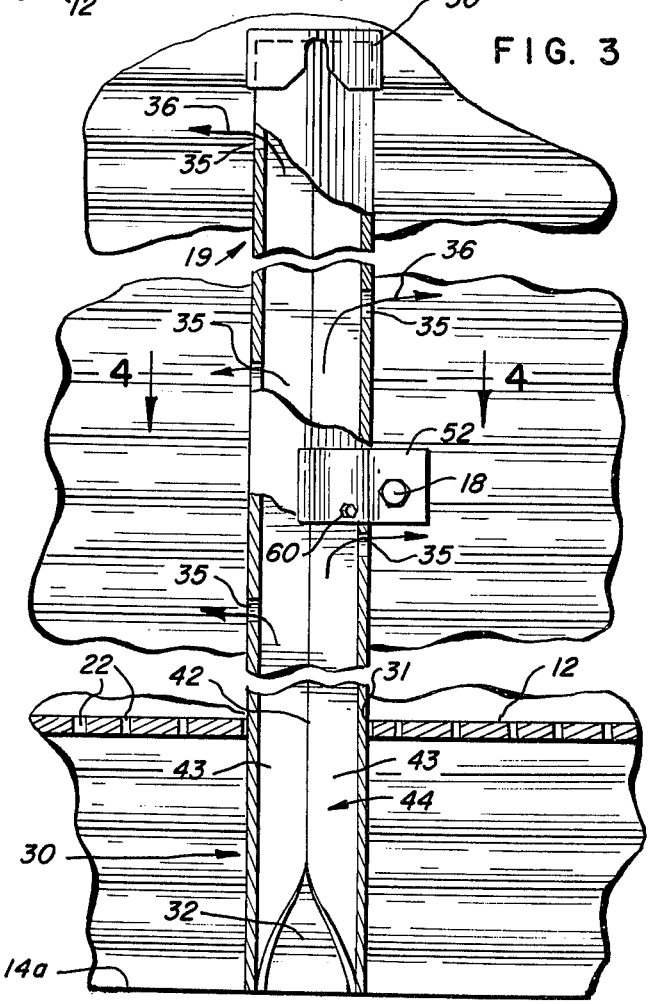
FIG. 3 is a front elevation view, partially in section, of one of the reinforcing drying ducts of the bin of FIG. 1.
Figure 6:
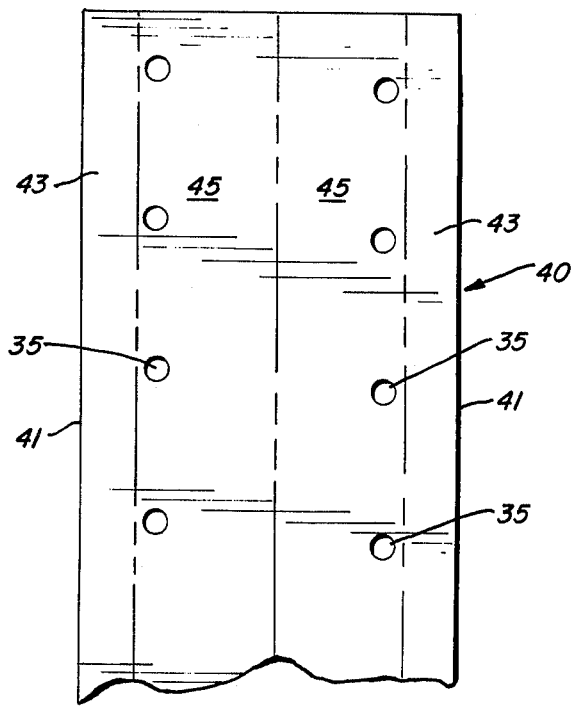
FIG. 6 is a partial plan view of a sheet metal blank for forming a reinforcing duct.

The illustrated tube 19 is formed by bending a flat metal sheet 40 (FIG. 6) to a triangular cross-section shape. The opposite edges 41 of the sheet 40 are pushed together so as to form a closed seam 42, as illustrated in FIG. 3. Adjacent edge panel portions 43 form the back wall 44 of the tube, and parallel center panel portions 45 form the two forward walls 46. The holes 35 are formed in the outer portions panels 45. To provide for ample air flow into the tube 19, in the illustrated embodiment, tab portions 47 of the lower back wall 44 are bent inward from the seam 42 so that the lower sections of these tab portions are substantially parallel to their respective adjoining walls 46. The bent tabs 47 are of sufficient size to provide a large opening 32 in the lower portion 30 of the tube 19 of a size as illustrated by the opening 32 in FIG. 3.

The upper end of each tube 19 is appropriately closed by a cap 50 to prevent grain from entering the tube 19 and to require the air flowing within the tube, as herein described, to exit through the holes 35. The tubes 19 are attached to the wall 15 by a plurality of brackets 52 and a bolt and a nut for each bracket transversing the wall 15 of the bin 11 through a hole 53 in the bracket and an aligned hole in the respective wall panel. Each of these attachment bolts may be one of the bolts 18 at the overlapping edges between the respective rings of panels, with a bracket 52 thus being provided at each ring joint for each duct 19, as shown. The hole 53 is positioned on a portion of the bracket 52 which is substantially parallel to the bin wall 15.

Each bracket 52 contains a second hole 55 therein. Said second hole 55 is positioned on the portion of said bracket 52 which is substantially parallel to an exposed surface of the tube 19. A self-tapping sheet metal screw 60 is provided to secure the tube 19 in affixed relation with each bracket 52, through the second hole 55. The screw 60 is not attached until the tube 19 has been properly positioned along the bin wall 15, with the lower end thereof 32 abutting the bin foundation 14. Upon proper installation of the tube 19 as described, it will provide added structural strength to the bin wall 15, obviating the need for metal sheets of increased thickness for the lower rings.

Upon operation of the blower heater unit 13, forced air enters the space 24, passes through the perforations 22 in the subfloor 12 of the bin 11, and flows upward through the grain as noted above. Simultaneously, air from the space 24 enters the open lower portions 30 of the tubes 19 and flows upward through the tubes 19 to the holes 35 where the force of the air directs the air outwardly from the tube 19. Due to the placement of the holes 35, air is emitted in a flow parallel to the wall 15.

The horizontal spacing of the tubes 19 is such that the bin is uniformly structurally strengthened both by providing vertical load bearing support and by preventing deflection and hence buckling of the panels. The spacing also is such that the air streams emitted from the tube holes 35 join approximately midway between adjacent tubes 19, thereby circulating air completely over the inner periphery of the bin wall 15. Moisture thereby is removed from the grain along the wall and condensation is prevented from accumulating on the bin wall 15. As the air rises through the grain from the space 24 below the subfloor 12, it also will rise from the tubes 19 and exit the bin 11 through the vented roof.

As a further specific example, triangular tubes 19 as illustrated herein have been formed of 24 gauge galvanized sheet steel. The blanks 40 were about 4¾ inches wide, with the panels 43 about ¾ inch wide and panels 45 about 1⅝ inch wide, and were bent to provide a triangular cross-section with each wall 44 and 46 about 1½ inch wide. The holes 35 were formed by punching, on 3 inch centers, and were ¼ inch in diameter for shelled corn and ⅛ inch in diameter for milo. These tubes were spaced on about 9¾ inch centerlines all around the inner surface of the bin wall of bins 21–36 feet in diameter. The tubes were 12 feet long for use in bins six to eight rings high, and spanned slightly more than the lower four rings (panels 17 normally are about 34 inches wide and, with the overlap between rings, lay up about 32 inches net height per ring). A mounting bracket 52 was attached at each adjacent ring joint for each tube. The opening 32 extended substantially the full width of wall 44 at the base and was about 2 inches high at the apex. Such tubes provided satisfactory air flow to obtain the drying desired around the periphery of the bin. At the same time, the tubes provided sufficient reinforcement for the wall panels that the described bins could be constructed using 20 gauge galvanized steel corrugated panels throughout the height of the bin walls.

By way of a comparison, bins without stiffeners and which are seven rings high preferably are constructed with a bottom ring formed of 14 gauge panels, the next two rings of 16 gauge panels, the fourth ring of 17 gauge panels, and the upper three rings of 20 gauge panels. All panels referred to above the standard corrugated galvanized sheet steel panels commonly used in such structures.

As a result of this invention it is no longer necessary to use various thicknesses of metal panels in a single bin. Without using separate special stiffeners, panels of uniform relative light gauge can be used throughout the height of a bin wall, resulting in lower bin construction costs, while at the same time maintaining proper structural stability of the bin and providing the desired aeration along the outer wall.

It will be seen that the aforementioned objects have been met.

It will be obvious that various modifications of the illustrated preferred embodiment may be made without departing from the spirit and scope of this invention. For example, the reinforcing conduits may be of a variety of cross-sectional shapes, including preformed cylindrical tubing, and may be provided with inlet and outlet openings of various shapes, sizes and distribution. Also the attachment brackets may be of various forms with various means of securement.

While a particular embodiment of this invention is shown and described herein, it will be understood, of course, that the invention is not to be limited thereto since many modifications may be made by those skilled in the art, particularly in light of the foregoing teachings. It is contemplated, therefore, by the appended claims, to cover any such modifications as fall within the true spirit and scope of this invention.

What is claimed is:

1. In a grain bin having a foundation including a bottom floor, a noninsulated wall supported on said foundation, a perforated subfloor spaced above said bottom floor and forming a chamber between said floors, and means for forcing dry air into said chamber;

means for preventing condensation from forming on the interior surface of said wall and for reinforcing said wall comprising:

a plurality of upright rigid hollow conduit members positioned about the interior of the bin wall in arcuately spaced relation to one another;

each of said conduit members resting at its lower end on said foundation;

means providing fluid communication between the hollow interior of each of said conduit members and said chamber when said conduit members are resting on said foundation;

each of said conduit members having a closed upper end;

each of said conduit members having a plurality of spaced air diffusing perforations formed therein, a predetermined number of which direct air flow laterally along said bin wall; and said conduit members being secured in reinforcing relation to the interior of said bin walls and with said lower ends resting on said foundation whereby said conduit members provide reinforcement and load bearing support for said wall.

2. The bin of claim 1 wherein said conduit members extend over a substantial portion of the height of said bin wall.

3. The bin of claim 2 wherein said conduit members are symmetrically arranged about the interior of said bin wall.

4. The bin of claim 1 wherein each of said conduit members has a plurality of angularly disposed planar surfaces.

5. The bin of claim 1 wherein said bin is formed of a plurality of rings of panels, said conduit members spanning at least the lower rings thereof, and means securing each of said conduit members to each of the lower rings of said wall.

6. The bin of claim 1 wherein said bin is formed of a plurality of rings of panels, said conduit members spanning at least the lower rings thereof, and means securing each of said conduit members to said wall at each adjacent junction between said rings.

7. A grain drying and bin support system for grain bins having a foundation, a bottom floor, a wall supported on said foundation, and a perforate sub-floor spaced above said bottom floor and delimiting a chamber therebetween, comprising a plurality of hollow conduit members extending vertically along the sidewall interior and secured to said sidewall in abutting relation with said foundation, each of said conduit members having a plurality of spaced air diffusing perforations formed therein and each provided with an access opening within said chamber to assure fluid communication between said chamber and the hollow conduit interior, whereby structural support for the bin wall is provided by the secured floor abutting conduits while effective grain drying is assured by the access opening and plurality of perforations in said conduits.

8. The system of claim 7 wherein said conduit members extend over a substantial portion of the height of said bin sidewall.

9. The bin of claim 7 wherein said bin is formed of a plurality of rings of panels, said conduit members spanning at least the lower rings thereof, and means securing each of said conduit members to each of the lower rings of said wall.

* * * * *